United States Patent [19]

Gavagan et al.

[11] Patent Number: 4,552,319
[45] Date of Patent: Nov. 12, 1985

[54] COMBINATION VSI AND ALR RETRACTOR

[75] Inventors: James A. Gavagan, Centerline; Jerry Motyka, Detroit, both of Mich.

[73] Assignee: Irvin Industries Inc., Rochester Hills, Mich.

[21] Appl. No.: 561,323

[22] Filed: Dec. 14, 1983

[51] Int. Cl.[4] .................. A62B 35/02; B65H 75/48
[52] U.S. Cl. .................. 242/107.4 A; 242/107.4 R
[58] Field of Search ............... 242/107.4 A, 107.4 B, 242/107.4 D, 107.7; 280/806; 297/478

[56] References Cited

U.S. PATENT DOCUMENTS

| | | | |
|---|---|---|---|
| 3,598,336 | 8/1971 | Frost | 242/107.4 D |
| 3,858,826 | 1/1975 | Sprecher | 242/107.7 |
| 3,897,913 | 8/1975 | Hall | 242/107.4 A |
| 3,999,723 | 12/1976 | Magyar | 242/107.4 D X |
| 4,436,255 | 3/1984 | Matsui et al. | 242/107.4 A |

Primary Examiner—Stuart S. Levy
Assistant Examiner—Katherine Jaekel

[57] ABSTRACT

Combination vehicle sensitive and automatic locking retractor responsive to full extraction of retractor webbing to establish automatic locking mode and responsive to full retraction to establish vehicle sensitive inertia mode.

5 Claims, 6 Drawing Figures

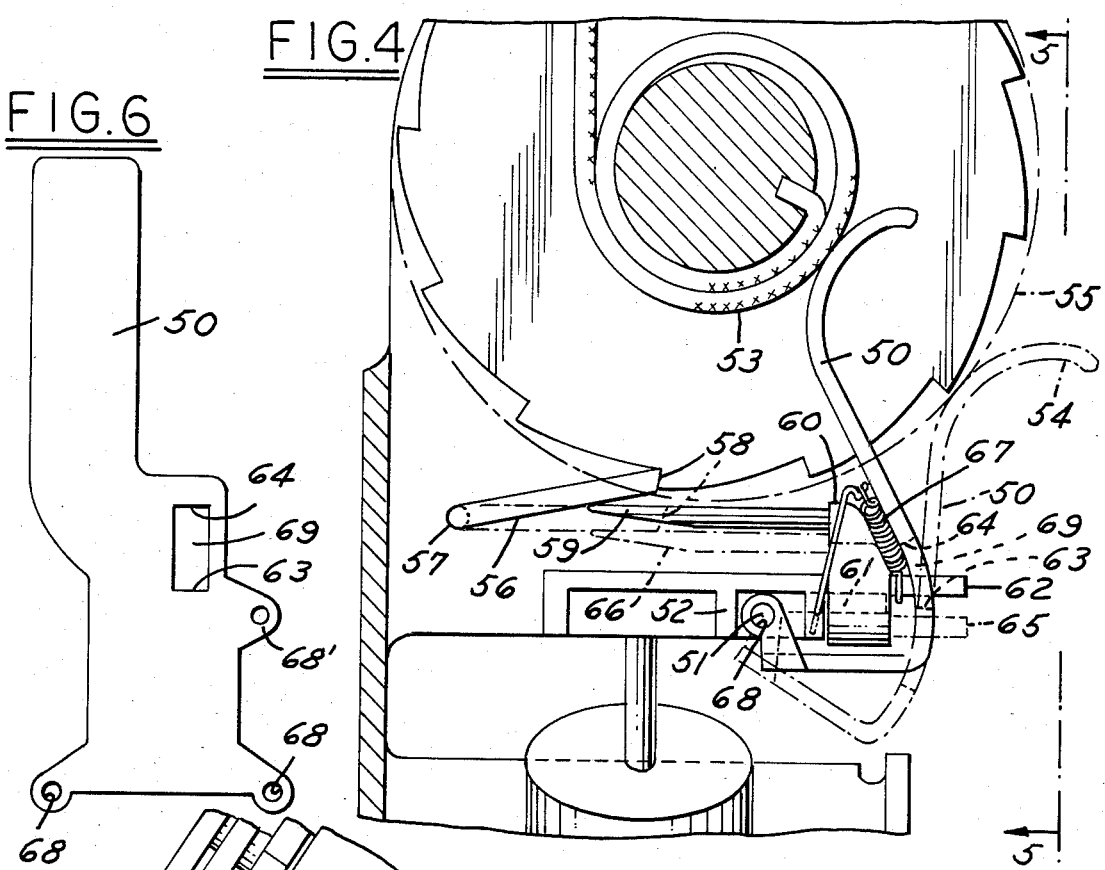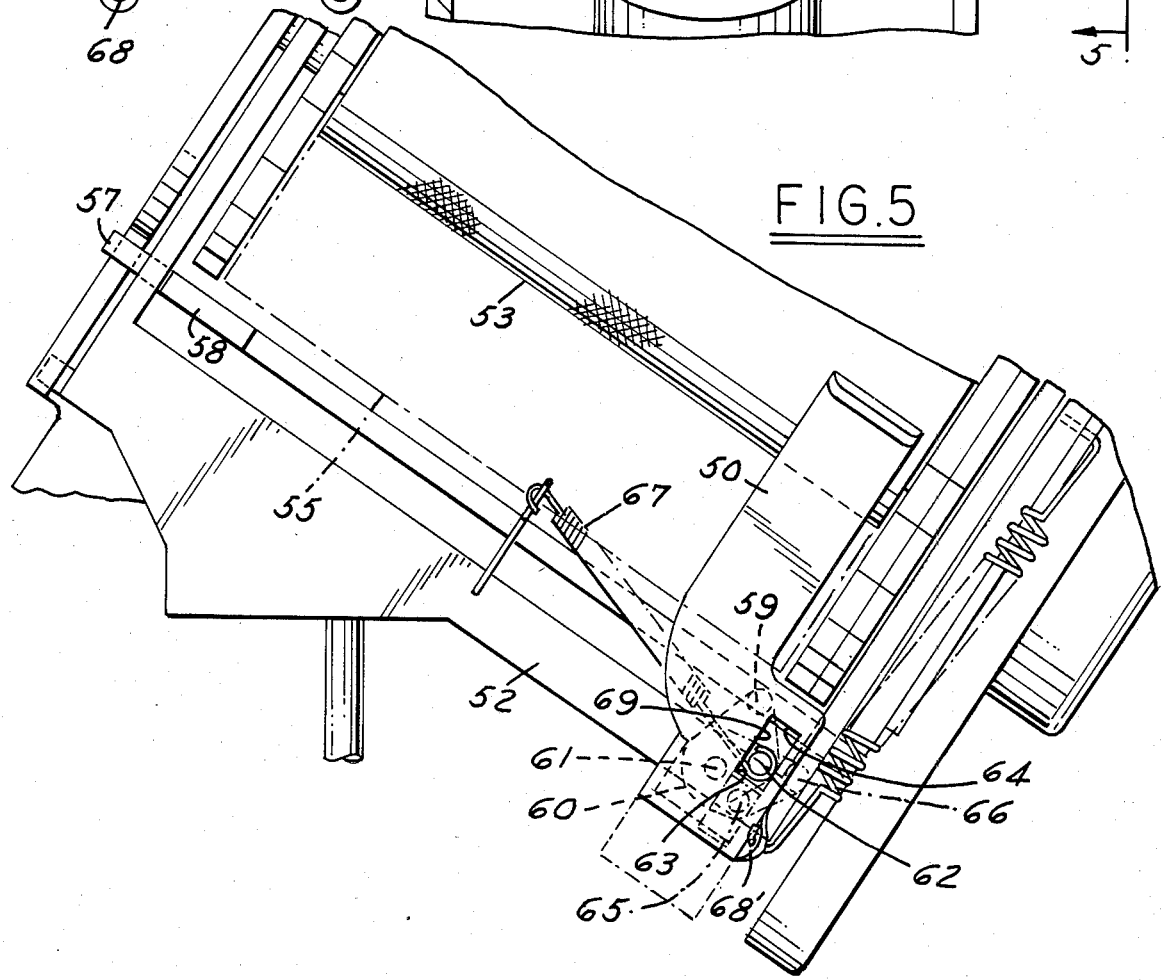

COMBINATION VSI AND ALR RETRACTOR

BACKGROUND OF THE INVENTION

Child restraint systems for automobiles are frequently designed to employ conventional seat belt and shoulder harness for strapping the child onto a child's seat placed on a conventional passenger seat, or in the case of children who do not require an auxiliary child's seat the harness may be applied to the child as in the case of an adult. In either case, where the child's feet do not touch the floor of the vehicle, the belt and shoulder harness restraining system may be required to hold the auxiliary seat, or child without such seat, against moderate deceleration or turning of the vehicle to prevent, forward pitching or lateral auxiliary seat tipping.

Where inertia responsive retractors are employed to accommodate free forward leaning of the passenger in the absence of sudden deceleration, such systems may be ineffective to adequately restrain children, either in auxiliary seats or otherwise, where foot bracing by the child is unavailable. In order to meet this problem, various means have been employed to lock the retractor when the restraint system is applied to a child as by a manual, lever, push buttom or other device located on the retractor housing adjacent the reel latch. Such solution has not been entirely satisfactory, particularly where the retractor housing is at an inconvenient location.

Accordingly, vehicle manufacturers have recognized the need for some means to convert a vehicle sensitive inertia retractor to an automatic locking mode which would be convenient for the adult applying the restraint system to a child; for example, in response to fully extracting the webbing whereupon retraction by the wind up spring would ratchet the latch to an automatic locking condition when all webbing play has been taken up with the child, including any auxiliary seat, in required restraint position.

BRIEF DESCRIPTION OF THE INVENTION

Applicants have developed three alternative viable mechanical solutions to the problems posed by vehicle manufacturers, one of which is web sensitive and the other two gear driven. In each of the embodiments a conventional inertia latch mechanism is adapted to permit free reeling of the web in and out against the retraction spring with a latch bar adapted to engage ratchet teeth locking the reel against webbing extension in response to predetermined deceleration of the vehicle through an inertia latching mechanism thereby functioning in a vehicle sensitive inertia mode, (VSI).

In each of the embodiments a mechanism is provided to supplement the inertia element to bias the latch bar toward an engaging position independently of deceleration whereby the webbing is locked against extraction but can ratchet in a retraction direction under the tension of the retractor wind up spring thereby establishing an automatic locking retractor mode, (ALR), operative to restrain a child with or without an auxiliary seat chair independently of inertia forces.

In each embodiment full extension of the belt webbing is adapted to establish the ALR mode and to retain such mode upon partial retraction to a child restraining position, and until release of the child from the seat followed by full retraction of the webbing disables the automatic locking mechanism and restores the VSI mode.

In one of the embodiments the level of belt webbing wound on the reel is employed to trigger the ALR locking mechanism at both extremities with a web level sensitive finger establishing the ALR mode at the minimum radius of belt webbing corresponding to full extraction and to restore the VSI mode at maximum radius corresponding to full retraction.

In second and third preferred embodiments an extension of the reel spindle is provided with a miniature pinion gear adapted to actuate an internal ring through a fractional part of one revolution between full belt extraction and full retraction. In one gear embodiment an internal segmental cam on the ring gear is adapted to actuate a detent/lever mechanism for biasing the latch bar to an ALR mode or to free it for conventional VSI operation.

In the other gear embodiment, the pinion drives an annular ring having parallel external circumferential cam tracks of different radial level engaged by the finger of a lever for biasing the latch bar to an ALR mode at minimum radius and freeing it for VSI operation at maximum with a ramp transition provision between the tracks at the extremities of belt extraction and retraction.

BRIEF DESCRIPTION OF THE DRAWINGS

FIG. 4 is a fragmentary end elevation of the web sensing mechanism of a third embodiment;

FIG. 5 is a view taken along the line 5—5 of FIG. 4;

FIG. 6 is a view of the web-sensing arm illustrated in FIG. 5 shown as a flat blank before forming;

DESCRIPTION OF A GEAR ACTUATED EMBODIMENT

Figure 1:
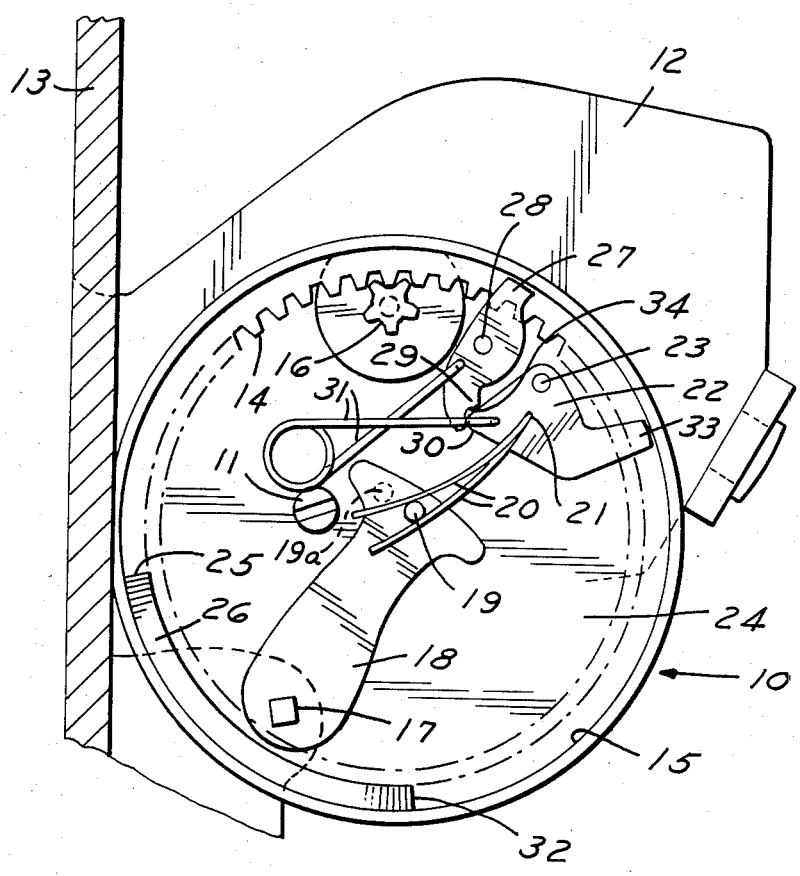
FIG. 1 is an end elevation of a gear actuated VSI-/ALR conversion mechanism with cover removed.

With reference to FIG. 1, gear housing 10 is attached by screw 11 to flange 12 of retractor frame 13. Internal gear 14 is slidably retained within cylindrical wall 15 of housing 10 and is actuated by pinion 16 on an extension of the retractor belt reel spindle which rotates with belt extraction and retraction, internal ring gear 14 being driven less than one complete revolution between full extraction and retraction of belt webbing. Extension 17 of the latch bar employed to engage ratchet teeth under inertia pendulum control in accordance with the disclosure of said copending application, has actuating arm 18 fixed thereto, adapted upon counterclockwise movement to bias the latch bar toward ratchet engagement for arresting extraction of the belt webbing. Projection 19 of arm 18 is engaged on either side by left spring fingers 20 anchored at 21 in detent lever 22 pivoted at 23 to back 24 of gear housing 10. Articulation of projection 19 from the position shown in solid to position 19a in phantom will change from VSI or ALR mode, arm 18 and detent lever 22 being shown in normal position for VSI mode operation under inertia pendulum control. Upon extraction of belt webbing, pinion 16 rotates in a clockwise direction driving ring gear 14 also in a clockwise direction until, upon full webbing extraction, end 25 of cam segment 26 engages auxiliary detent lever 27 pivoted at 28 to housing back 24 causing clockwise articulation of detent lever 27 to move its detent notch 29 out of engagement with nose 30 of detent lever 22 permitting spring arms 31, the ends of which are biased towards each other, to rotate detent lever 22 in a clockwise direction thereby biasing arm 18 toward a latch engaging position ratcheting of which, upon belt retraction, is accommodated by leaf spring fingers 20.

Upon full retraction of the belt beyond any possible child restraining position end 32 of segment cam 26 engages detent lever 22 extension 33 withdrawing nose 30 from detent pocket 34 in auxiliary detent lever 27 permitting spring arms 31 to return the respective detent levers to their normal position as shown in FIG. 1.

Thus the extremity of belt webbing extension is required to actuate auxiliary detent lever 27 permitting spring arms 31 to move detent lever 22 to a latch biasing ALR position of arm 18 and extremity of belt retraction is required to actuate detent lever 22 to reestablish normal VSI mode operation.

DESCRIPTION OF ALTERNATIVE GEAR EMBODIMENT

Figure 2:
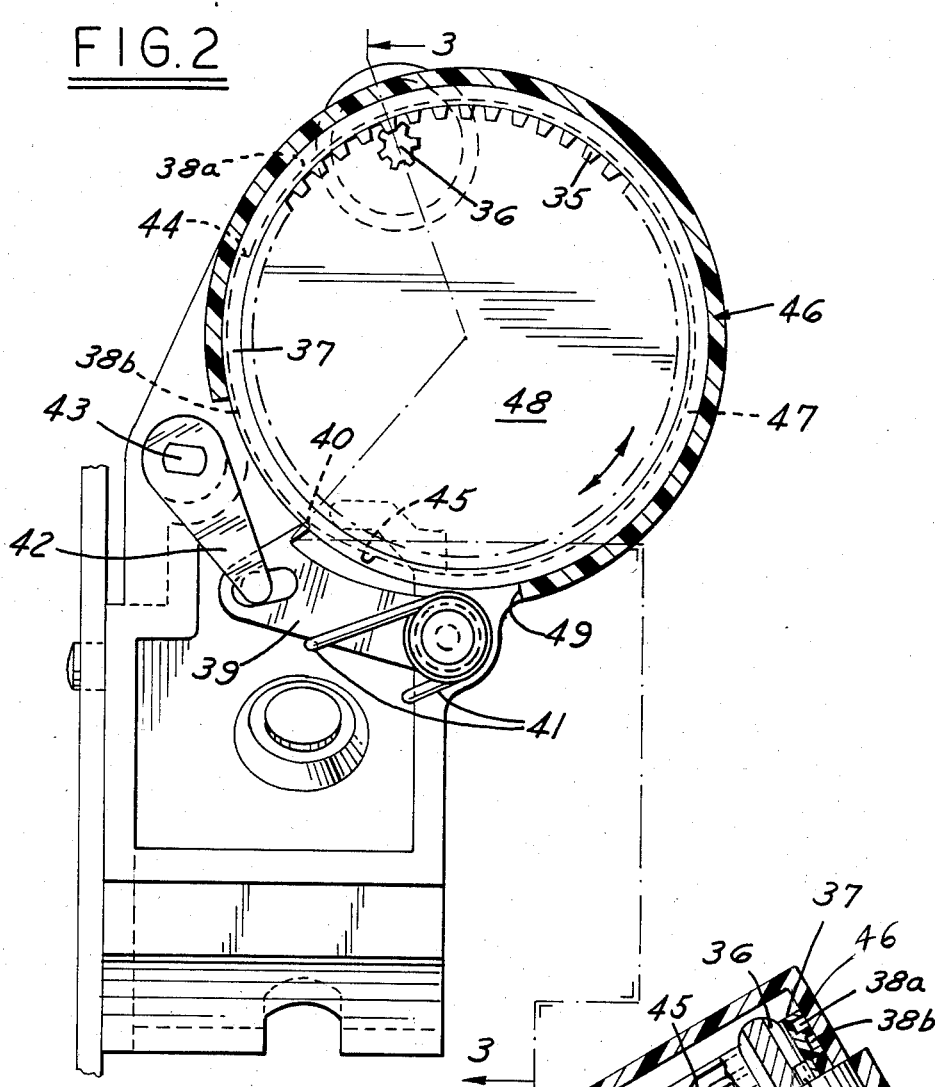
FIG. 2 is an enlarged end view of the gear mechanism of a second embodiment.
Figure 3:
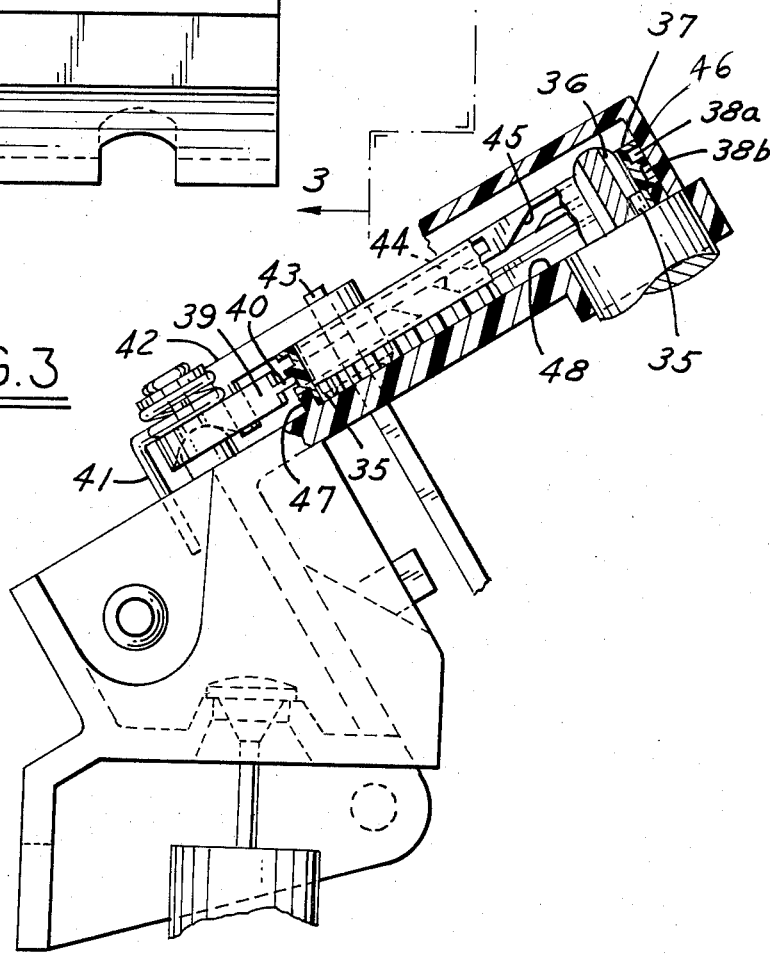
FIG. 3 is a view taken along the line 3—3 of FIG. 2.

With reference to FIGS. 2 and 3 gear 35 driven by pinion 36 carries annular track 37 having two parallel axially spaced external circumferential grooves 38a and 38b having differential depths, e.g. 0.120" for groove 38a and 0.050" for groove 38b. Lever 39, having groove engaging finger 40 biased toward engagement by torque spring 41, actuates latch lever 42 connected to latch extension 43 which biases lever 42 to an ALR mode when finger 40 is in the deeper groove and frees lever 42 for VSI mode operation when finger 40 is in the shallower groove.

As best shown in FIG. 3 a transition diversion groove 44 moves finger 40 from shallower groove 38b to deeper groove 38a upon clockwise rotation of gear 35 and grooves 38a, 38b to an extremity corresponding to full belt extraction, and transition ramp groove 45 raises finger 40 from deeper groove 38a and moves it over into shallower groove 38b upon counterclockwise rotation of gear 35 and grooves 38a, 38b to an extremity corresponding to full belt retraction. Cylindrical housing 46 with radial flange 47 on backing plate 48 through which pinion 36 projects, provide a bearing for the gear and track assembly with an access slot 49 providing an opening for lever finger 40 to engage the track grooves.

A supplemental segmental cover (not shown) is preferably provided, for levers 39 and 42 and spring 41, which may be secured to housing 46 by suitable means.

FIGS. 4 and 5, illustrate the alternative web sensing control for converting between VSI and ALR modes, on a commercial retractor sold to Fisher Body Division of General Motors Corp. under Fisher Body Part Nos. 20421244 (R.H.) and 20472650 (L.H.). Web sensing arm 50 pivotally mounted at 51 to a conventional bracket 52 for VSI control is spring biased to bear against belt webbing 53 shown in full extended condition and position 54 corresponding to fully retracted position of belt webbing 55. Conventional latch bar 56, shown in phantom pivoted at 57 with latch nose 58 in a latching attitude, is biased to such position by a spring arm 59 extending from lever 60 pivotally mounted at 61 on bracket 52 on an axis extending parallel to spring arm 59 and having projection 62 engageable by slot extremity 63 in web sensing arm 50 to raise spring arm 59 to the position shown upon full extension of belt webbing, it being understood that spring arm 59 will deflect under latch bar 56 and permit ratcheting thereof from reel spring retraction.

In such position spring arm 59 extends directly above parallel pivot 61 of lever 60 as best shown in FIG. 5 so that reaction from spring arm 59 biasing of latch bar 56 creates no torque movement tending to rotate lever 60 about pivot 61. As also best shown in FIG. 5, projection 62 is offset from pivot 61 so that actuation by slot edge 63 can rotate lever 60 to the latch engagement biasing position of spring arm 59 as shown. Upon retraction of belt webbing, upper slot extremity 64 ultimately engages projection 62 depressing it to a lower position 65 moving spring arm 59 to a non biasing position 66 where VSI mode will be restored. Lost motion between slot extremities 63 and 64 permits lever 60 to remain in latch bar biasing or unbiasing attitude at intermediate positions of belt webbing. Predetermined friction in pivot 61 might be sufficient to retain lever 60 in its biasing or non-biasing position until actuated by either slot extremity 63 or 64; however, it is preferred to apply a light over-center spring 67 acting in the plane of FIG. 5 with a connection to lever 60 on the far side of pivot 61 having a line of spring tension passing across pivot 61 to provide an over center biasing of lever 60 in either direction.

With reference to FIG. 6, web sensing arm 50 is illustrated as a flat blank, prior to forming, illustrating pivot holes 68, spring connection ear 68', and the form of slot 69 shown only in phantom in FIG. 5.

We claim:

1. Combination vehicle sensitive inertia, and automatic locking retractor, comprising a vehicle sensitive inertia retractor having spring wind-up webbing reel means with a ratchet and a latch bar normally actuated by inertia means for locking the reel means against webbing extraction, and supplemental means biasing the latch bar toward extraction locking ratchet engagement in response to full webbing extraction beyond occupant restraining position to cause said retractor upon webbing spring wind-up to a passenger restraining position to automatically lock in an automatic locking retractor mode against extraction without inertia actuation, said supplemental means including gearing responsive to reel rotation for sensing full webbing extraction and retraction, latch bar biasing control detent lever means movable between an automatic locking retractor position and a vehicle sensitive inertia position modes by said gearing at extremities of said webbing extraction and retraction, said detent lever means including a pair of separate noncoaxially pivotally mounted interengaging levers, and detent means on said levers to maintain said detent lever means in said automatic locking retractor position or said vehicle sensitive inertia position when the webbing is wound on or off the reel an amount between the extremities of webbing extraction and retraction, and means responsive to said lever means for restoring normal vehicle sensitive inertia operation upon full belt retraction beyond occupant restraining position.

2. The combination of claim 1 including a latch bar biasing arm positioned by resilient means mounted on one of said detent levers.

3. The combination of claim 2 including spring means reacting between said pair of detent levers biasing their position relative to each other.

4. The combination of claim 1 including a webbing reel driven pinion, and an internal gear driven by said pinion.

5. The combination of claim 4 including cam stop means on said internal gear for actuating said respective levers at opposite extremities of internal gear rotation.

* * * * *